Dec. 11, 1956  W. T. O'NEIL  2,774,064
OVERTAKE WARNING AND WAVE-OFF
Filed Dec. 24, 1951  4 Sheets-Sheet 1
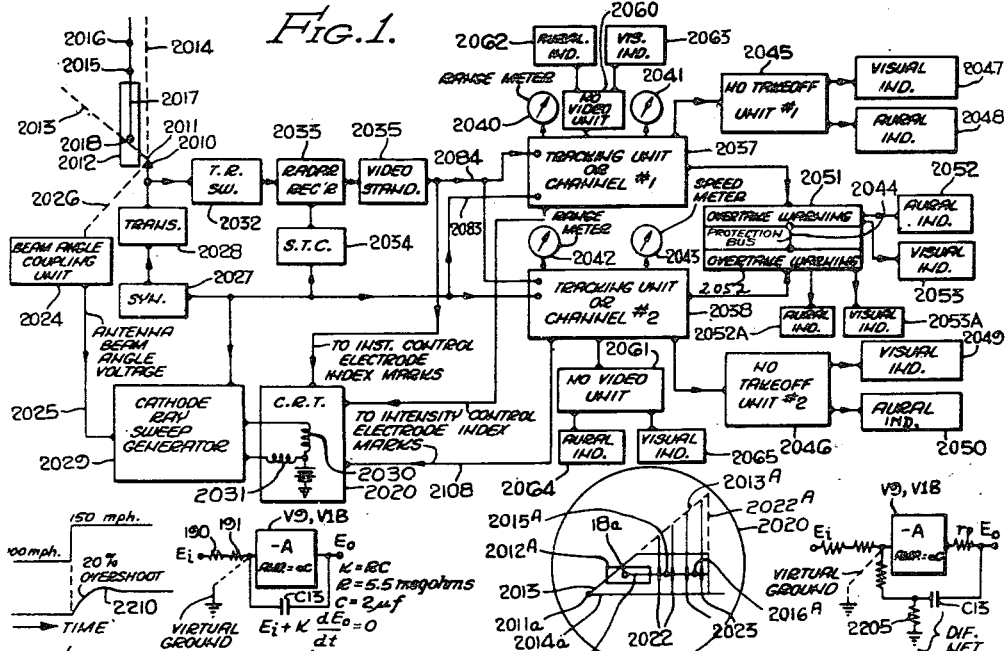
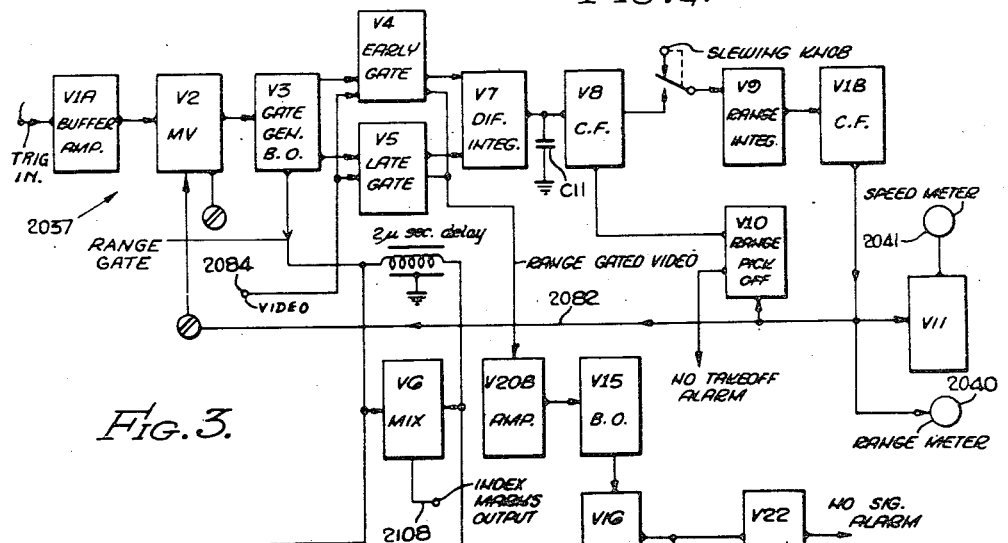
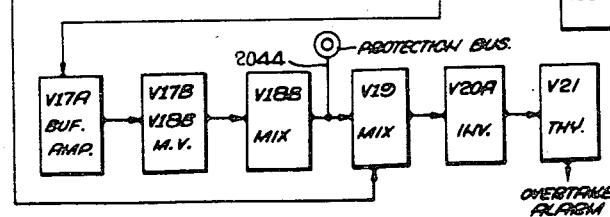
INVENTOR.
WILLIAM T. O'NEIL INVENTOR.
WILLIAM T. O'NEIL
BY Lyon & Lyon
ATTORNEYS Dec. 11, 1956 W. T. O'NEIL 2,774,064
OVERTAKE WARNING AND WAVE-OFF
Filed Dec. 24, 1951. 4 Sheets-Sheet 3
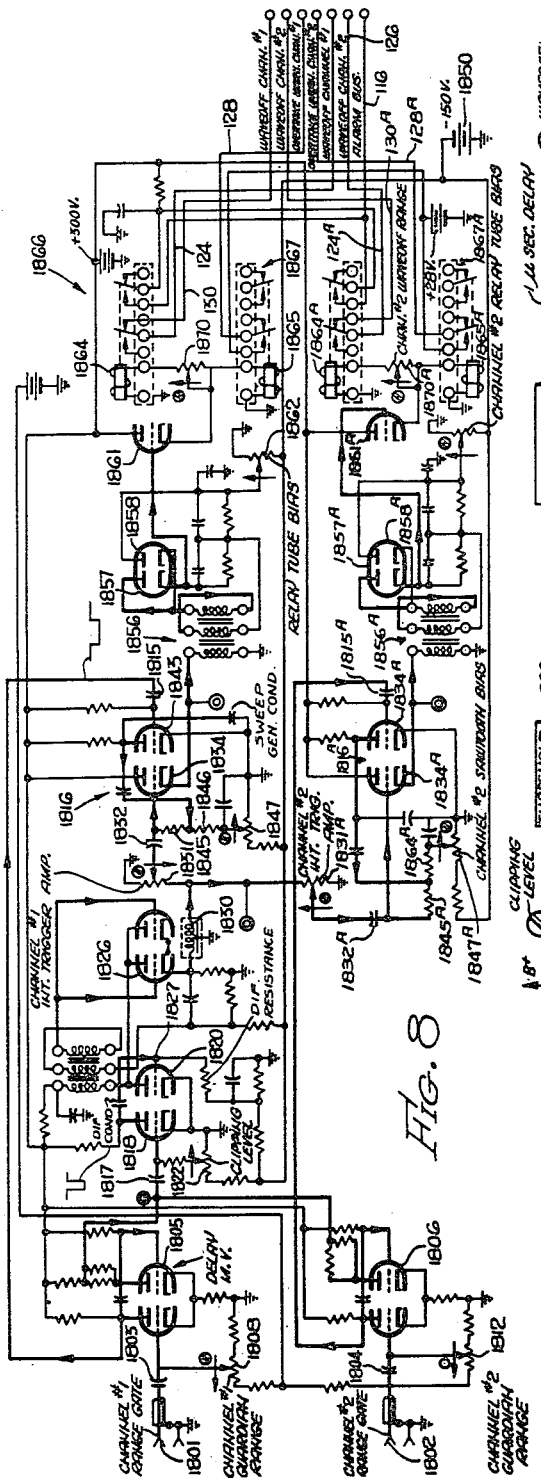
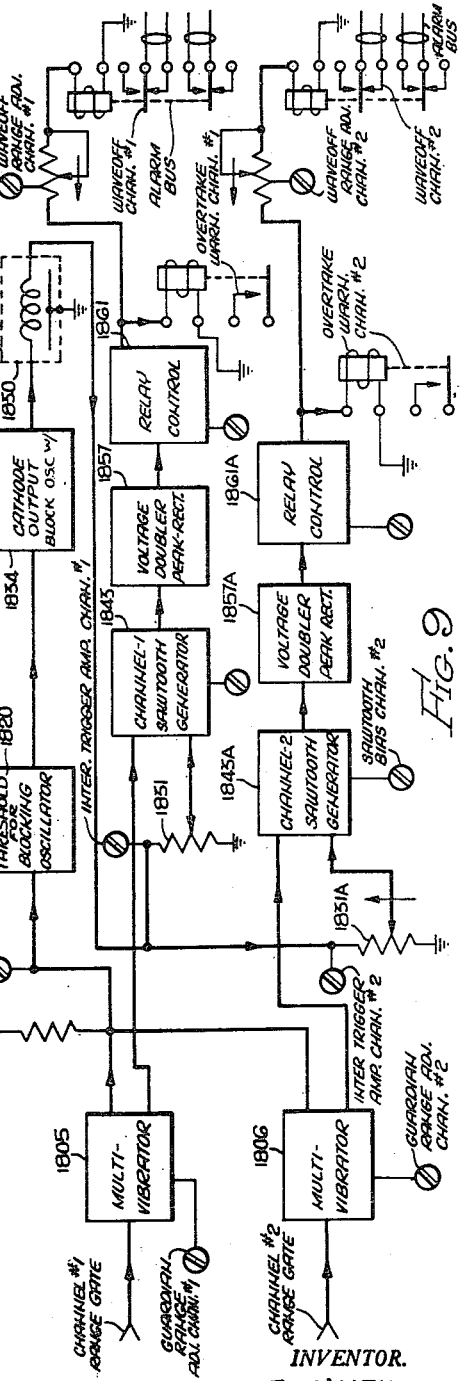
INVENTOR.
WILLIAM T. O'NEIL
BY
Lyon & Lyon
ATTORNEYS Dec. 11, 1956 W. T. O'NEIL 2,774,064
OVERTAKE WARNING AND WAVE-OFF
Filed Dec. 24, 1951 4 Sheets-Sheet 4
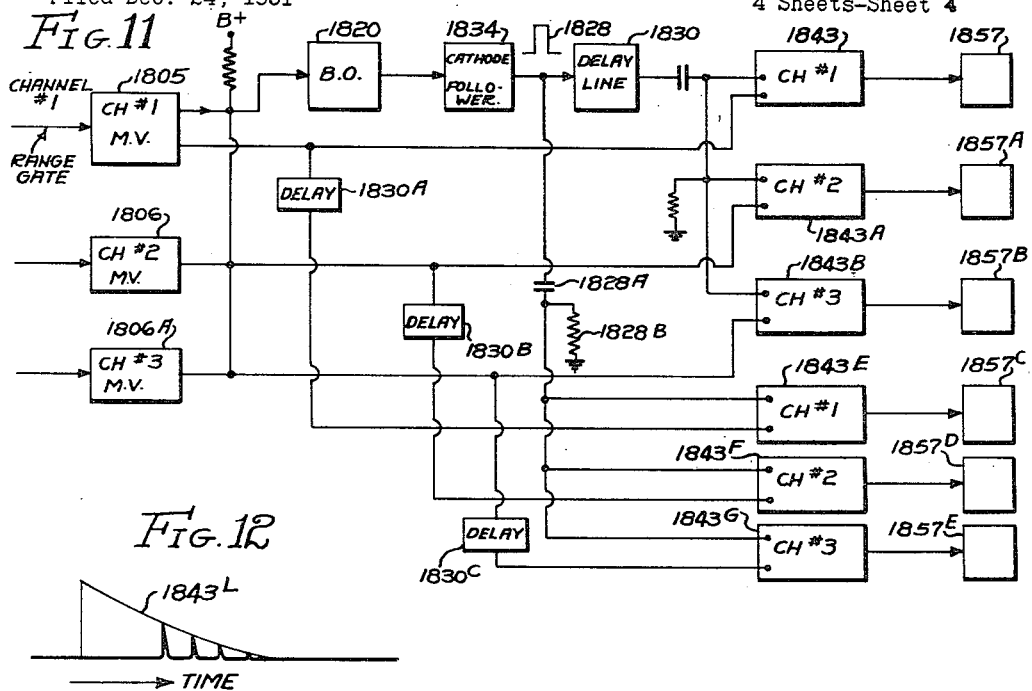
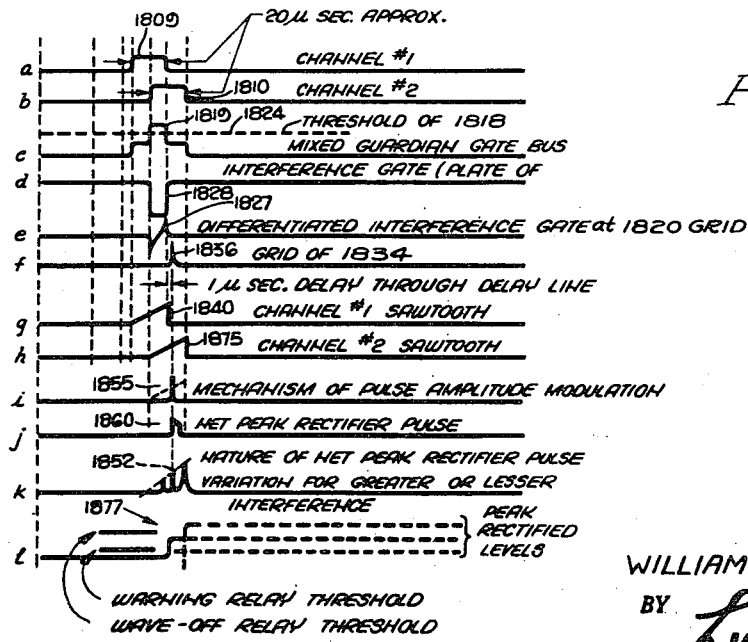
INVENTOR.
WILLIAM T. O'NEIL
BY Lyon & Lyon
ATTORNEYS

United States Patent Office 2,774,064
Patented Dec. 11, 1956

2,774,064

OVERTAKE WARNING AND WAVE-OFF

William T. O'Neil, La Crescenta, Calif., assignor to Gilfillan Bros., Inc., Los Angeles, Calif., a corporation of California Application December 24, 1951, Serial No. 263,079

13 Claims. (Cl. 343—7)

The present invention relates to means and techniques particularly useful in automatic ground controlled aircraft landing systems, the present application being specifically useful in producing overtake warnings and wave-offs when the spacing between two aircraft is less than a predetermined amount; although as is evident from the description herein, the means and techniques have broader application in that other purposes may be achieved when two pulses or signals occur within a predetermined minimum time interval whereby an object represented either at the earlier or later degree or signal, may be controlled.

The system described in the aforementioned patent application is useful in controlling automatically the flight of a plurality of aircraft simultaneously in the approach zone to the aircraft landing field. In such system it is desirable to provide means whereby both the ground crew and pilot of an approaching aircraft is advised, for safety purposes, that such approaching aircraft is within a predetermined safe minimum distance of a preceding aircraft. The means for developing such information is referred to generally as overtake warning and wave-off apparatus.

As described in one of the systems herein, a warning signal is first produced initially when and as the approaching aircraft is within a predetermined minimum spacing from a preceding aircraft; thereafter, should the pilot not heed the warning and reach another closer predetermined distance from the preceding aircraft, control signals, in the form of wave-off signals, are transmitted from the radar situs to the aircraft, to release the aircraft from automatic tracking control and to transmit a maximum "fly up" signal to the aircraft.

More specifically, in the automatic ground control approach system there is provided a plurality of range tracking units, designated for purposes of convenience, as channel No. 1 and channel No. 2. Each of these channels generates a range gate directly proportional to the instantaneous range of the aircraft tracked by that particular channel. This range gate is applied to a corresponding network in the so-called overtake warning and wave-off unit, to create a so-called "safety gate" of manually variable width, immediately following the tracked aircraft.

The safety or guardian gates following each tracked aircraft are applied to a common bus, which is constantly monitored by a coincidence detector. Overlapping of the guardian gate of one tracked aircraft with that of another develops an interference gate, such gate being differentiated, delayed and used in conjunction with sawtooth generator circuitry, the output of which is measured for control purposes.

The degree of "overtake" expressed as an output voltage for each channel is measured by two relay control circuits. The existence of an "overtake" condition results in closing of a so-called "overtake warning" relay, which provides suitable warnings. Greater degrees of "overtake" actuate the so-called "wave-off" relay to cause the transmission of wave-off signals to the aircraft.

The object of the present invention is to provide means and techniques whereby the aforementioned results may be achieved.

A specific object of the present invention is to provide a plurality of signals or pulses, each representing an object, and to provide means whereby control signals may be developed for controlling either one of said plurality of objects in the event that the time spacing between the signals or pulses falls within a predetermined minimum spacing.

Another specific object of the present invention is to provide apparatus of this character which is capable of operating with apparatus described in the above mentioned patent application for producing control signals should the radial spacing between successive aircraft become less than, for example, a value adjustable between one and four miles.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a block diagram of a system and apparatus incorporating features of the present invention.

Figure 2 shows the type of visual display obtained on the face of the cathode ray tube which is an element of the system shown in Figure 1.

Figure 3 is a block diagram of apparatus included in each one of the tracking units illustrated as such in Figure 1, for developing range gates, the time spacing of which are monitored and measured for purposes of developing control signals in accordance with the features of the present invention.

Figure 4:
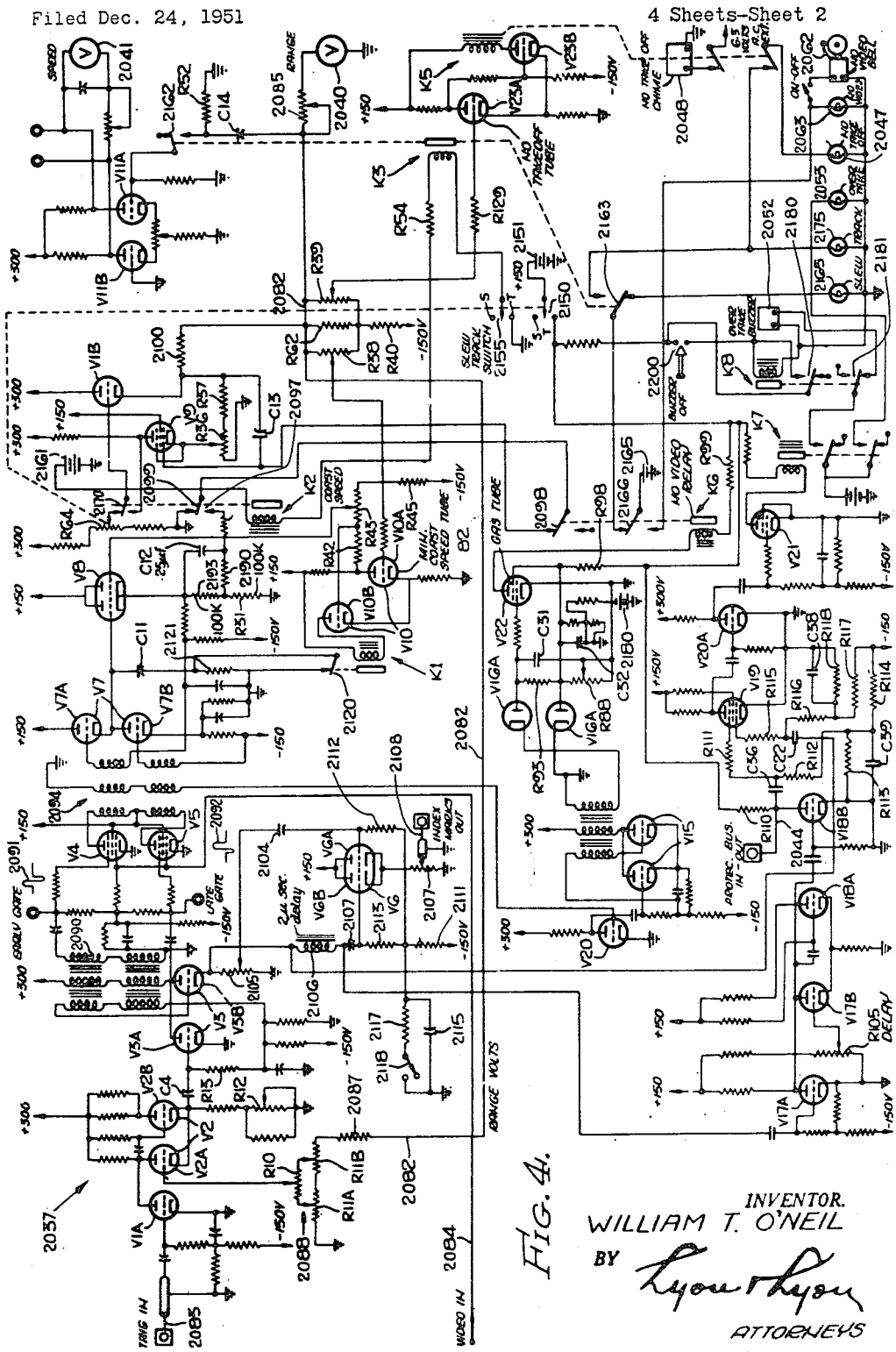
Figure 4 is a schematic diagram showing in more detail form circuitry indicated in block diagram in Figure 3 with related circuitry indicated in Figure 1.

Figure 5 serves to illustrate dynamic response to the tracking loop in each of the tracking units occasioned by an assumed change in speed.

Figures 6 and 7 serve to illustrate equivalent circuits of the second integrator stage in the range tracking unit.

Figures 8 and 9 represent respectively a modified and preferred form of overtake warning and wave-off apparatus embodying features of the present invention.

Figure 10 represents certain wave forms developed in the apparatus illustrated in Figures 8 and 9.

Figure 11 illustrates another modified form of the present invention particularly useful and illustrates the manner in which an object, representing either an earlier or later pulse, may be controlled when the spacing between such pulses falls within a predetermined minimum spacing, it being noted that the earlier modifications are generally for the purpose of developing signals for controlling the object represented by the later pulse, but the system illustrated in Figure 11 is adaptable to the control of the object represented either by the earlier or later pulse.

Figure 12 shows the type of sawtooth waveform used in a portion of the apparatus illustrated in Figure 11.

For purposes of tracking one aircraft so as to obtain data as to its range and speed, one tracking unit or apparatus, i. e., one channel, either unit 2037 or 2038 of the character shown in Figures 1, 3 and 4 is required. For purposes of obtaining the same data regarding two different aircraft simultaneously in the approach zone to an aircraft landing field, the tracking apparatus shown in Figures 1 and 2 is duplicated, i. e., both units 2037 and 2038 are required as shown in Figure 1; for obtaining the same data regarding three aircraft, the apparatus is triplicated and so forth. By using a plurality of such apparatus, data is automatically obtained as to the relative distance between the tracked aircraft.

It should be noted, however, that only one radar installation is required for developing the synchronizing triggers and the associated video signals, the synchronizing signals and radar video being supplied to each one of the tracking units 2037, 2038, which are likewise termed channels or apparatus herein. Only one of the tracking channels is described in detail for it is understood that the other tracking channels are of identical construction and function in the same manner. The manner in which the tracking channels are interrelated for purposes of producing warnings when one aircraft overtakes, i. e., is separated an unsafe distance from, a preceding aircraft is described after the complete description of one of the tracking apparatus or channels.

While the tracking channel may automatically acquire a target, i. e., an aircraft, using a .1 cycle per second saw tooth wave with associated means, the present apparatus incorporates manually operative means for producing target acquisition. The tracking of the aircraft is displayed visually by adding to the cathode ray indicator tube presentation a pair of vertical bars 2022 or 2023 (Figure 2), each of which represents the leading and trailing edges of the tracking range gate developed in the apparatus. These vertical pairs bracket the associated targets 2015A, 2016A, respectively. Separate intensity controls for the range gate displays are provided, permitting adjustment to be made so that no impairment of the radar display results. A momentary switch is also provided so that the operator may remove the parallel bars from the display so that he may ascertain on which target the associated tracking channel is working.

The tracking channel incorporates velocity memory means. Such velocity memory means continuously provides a predicted range position of the target during intervals when target video is not available as, for example, when the antenna beam is scanning through space adjacent the aircraft. The dynamic performance characteristic of the tracking channel is such as to rely heavily upon memory of velocity. The resulting performance is such as to minimize the tendency of a particular tracking channel to lock onto ground clutter signals instead of continuously following the aircraft in its flight. The absence of radar video signals from the tracked target or aircraft for a period of, for example, 5 seconds causes actuation of an automatic aural and visual alarm for the monitoring operator, using the "no video" units 2060, 2061 in Figure 1.

To further improve the ability of the tracking channel to follow an aircraft through clutter areas, the tracking channel incorporates means which will not permit the tracking channel to move forward with a velocity less than approximately 50 miles per hour, thus reducing the tendency of the tracking channel to lock on stationary targets.

The output of the range tracking channel is essentially (1) the instantaneous range of the aircraft shown on corresponding meters 2040, 2042, (2) the velocity of the aircraft shown on corresponding meters 2041, 2043, and (3) a range gate developed in the channel to provide a visual display of the tracked aircraft as seen by the pairs of index marks 2022 and 2023 in Figure 2, such range gate being used also in the overtake alarm system or unit 2051 to guard against collision in the aircraft approach zone. This overtake alarm system receives range gates corresponding to the range of each of the target aircraft and provides visual and aural alarms on indicators 2053 and 2052 whenever a minimum adjustable spacing of, for example, 1 to 4 miles is violated. The range gates are used also to provide an additional safety feature mentioned in the next paragraph.

An additional safety feature involves interference between incoming landing aircraft and those entering the runway for take-off. To minimize hazard and to make sure that the operator is aware of aircraft on approach, a warning is provided when a landing aircraft is a predetermined distance from touchdown and indicated on indicators 2047, 2048, 2049, 2050. This predetermined range is adjustable from one to five miles from touchdown and is designated herein as the "No Take-off Warning" area.

The tracking channel 2037 thus incorporates means for indicating the range to touchdown and the radial velocity of the tracked aircraft on meters 2040 and 2041, respectively. Aural notification is given when an aircraft enters the "No Take-off Warning" range on indicator 2048. This notification is preferably in the form of a chime tone; but, in addition, means are incorporated for producing a continuous visual indication on indicator 2047 of this condition until the aircraft is released at touchdown.

A violation of the minimum aircraft spacing results in an aural and visual warning to the operator on indicators 2052A and 2053. In developing usch overtake warnings, an overtake warning unit 2051 is provided to which is supplied range gates from each of the range tracking channels 2037, 2038. A safety or "guardian" gate is generated following the incidence of each of the range gates. The duration of this safety gate constitutes the arbitrarily selected minimum safe aircraft spacing and is manually adjustable in duration for a period equivalent of one mile to that of four miles. Throughout the entire radar range the guardian gate sum is monitored for the presence of overlaps. If the position of another aircraft encroaches within the safety gate of a preceding craft the alarm circuits are actuated.

The radar system shown in Figure 1 includes an antenna 2010 disposed at the point 2011 adjacent the aircraft landing strip 2012 for producing a radiated radar antenna beam, which scans between the limits indicated by the radial lines 2013 and 2014, both emanating from the point 2011 so as to include that area within the approach zone to the landing strip 2012 to which aircraft 2015, 2016 are flown along or adjacent to a predetermined runway line 2017, such line 2017 terminating at the touchdown point 2018.

Conventional apparatus which, per se, forms no part of the present invention is coupled to the antenna 2010 for producing a cathode ray tube display of the character shown in Figure 2 on the face of the cathode ray tube 2020. The display on cathode ray tube 2020 in Figure 2 is representative of those aircraft landing conditions shown in Figure 1 and the two aircraft 2015, 2016 appear as corresponding visible indications 2015A, 2016A. The runway line 2017A may be produced electronically by conventional means which, per se, forms no part of the present invention, the small rectangle 2012A may be a transparent overlay so as to correspond with the landing strip 2012 and the radial lines 2013A, 2014A, define the limits through which the cathode ray beam is caused to periodically sweep. These cathode ray beam sweeps originate from the point 2011A corresponding to the situs 2011 of the radar equipment.

The cathode ray tube display shown in Figure 2 also includes two pairs of index marks 2022, 2023, bracketing the aircraft images 2015A and 2016A, respectively. These pairs of index marks 2022, 2023 are produced electronically. The small rectangle in Figure 2 defined by the dotted portions of lines 2013A and 2022A serves as an indication of that portion of the display which is limited or clipped, i. e., rendered invisible. Such pattern limiting or clipping forms, per se, no part of the present invention and is, for present purposes, considered conventional.

For purposes of obtaining cathode ray beam sweeps to form the pattern shown in Figure 2, the scanning movement of the antenna beam emanating from antenna 2010 is converted by a so-called beam angle coupling unit 2024 into a so-called antenna beam angle voltage which appears on the lead 2025. Such voltage may vary from 2 negative-going wave form and is applied to the early detector V4. The second or "late" gate 2092 consists of a negative-going wave form followed by a positive-going wave form and is applied to the suppressor grid of the late detector V5. These positive portions of the pulses 2091, 2092 produced by oscillator V3 thus appear alternately at the suppressor grids of the early-late gate detectors V4 and V5 causing them to be placed in a condition that they may conduct when positive video signals are coincidentally applied from lead 2084 to the respective control grids of tubes V4 and V5. In other words, tubes V4 and V5 are essentially coincidence tubes arranged to conduct only when there is a positive signal applied both to their control grids and suppressor grids.

Preferably the video applied to lead 2084 is so-called standardized video in which each video signal, resulting from a reflection from the aircraft, has a uniform height and a uniform width so that, in effect, such video may be uniformly compared with the positive portions of the wave forms 2091, 2092.

The signal passed by the early-late detectors V4, V5 is applied to the grids of a differential integrator circuit consisting of two triode sections of V7A and V7B of stage V7.

It is observed that video signals corresponding with the positive-going portion of the early gate 2091 are passed by tube V4. Video signals corresponding with the positive-going portion of the late gate 2092 are passed by tube V5. The signal appearing on the anode of tube V4 is applied through pulse transformer 2094 to integrator tube V7A so as to charge condenser C11. Video signals corresponding with the positive portion of the late gate 2092 are passed by tube V5 and applied by pulse transformer 2094 to the control grid of the integrator tube V7B, lowering the voltage on capacitor C11. The combined effect therefor of the early-late gate detector circuitry is to charge condenser C11 when radar video corresponds with the early gate (indicating that the aircraft is moving forward at a rate greater than that of the range gate), and to discharge condenser C11 at the time of coincidence of video signals with the late gate (indicating that the gate is going forward at a greater rate than the aircraft). The combined output of tubes V7A and V7B appearing across condenser C11 therefore may be interpreted as a "speed" voltage for the tracked aircraft. It is noted that the range gate mentioned in the previous sentence, is defined by the positive portions of the wave forms 2091, 2092, such positive portions being displaced, of course, along the time axis. This speed voltage appearing across condenser C11 produces a proportional voltage on the cathode of the cathode follower tube V8.

Such voltage appearing on the cathode of tube V8 is applied to the control grid of the range integrator tube V9 through switch 2099 of relay K2 and switch 2098 of relay K6. It is noted that the relay K2 is shown in its de-energized condition corresponding to the condition wherein the circuitry is adjusted for manual tracking, i. e., slewing. When the circuitry is conditioned for automatic tracking the winding of relay K2 is energized so as to close the switch 2097 and to open the switch 2099. Relay K6 is shown in its automatic tracking position which, of course, corresponds to the de-energized condition of the winding of relay K6.

Thus in automatic tracking the "speed" voltage appearing on the cathode of V8 is applied to the control grid of the second integrator stage V9 and the integrator output appears on the cathode of tube V1B which is a cathode follower. Such voltage appearing on the cathode of V1B is applied through resistance 2100 to the range voltage lead 2082. This voltage on the cathode of tube V1B consists of integrated "speed" voltage and represents the range of the tracked aircraft in terms of nautical miles.

It is noted that the lead 2082 is connected to variable potentiometer resistances R38, R39, and fixed resistance R62, each of such resistances being connected in parallel. The adjustable tap on resistance R38 is connected to the minimum coast speed circuit which includes the tubes V10A and V10B. The adjustable tap on resistance R39 is connected to the "no take-off" circuit which includes the tubes V23A, V23B.

The potential existing on lead 2082 is measured by the range volt meter 2040 on a linear scale with the maximum range of 10 miles represented by a 50-volt potential. In other words, the scale is 5 volts per mile.

The output measured by the range volt meter 2040 is applied, for purposes of obtaining a visual indication of speed of the aircraft, to a differentiating network consisting of a C14 and R52. The voltage at the output of this differentiating network representing speed is applied to the control grid of tube V11A. This speed voltage, appearing as a potential across the anodes of tubes V11A and V11B is measured by the speed volt meter 2041 on a scale of 0–50 microamperes, expressed as 0–250 miles per hour.

As indicated above, the potential measured by the range volt meter 2040 is also applied to the control grid of the delay multivibrator which includes the tubes V2A and V2B, the gate width of the multivibrator output being controlled by such range voltage applied through the R10, R11A, R11B potentiometer combination. The pulse width of the output of the multivibrator V2, controlled as a direct function of range voltage, causes the tracking movement of the index marks 2022 (Figure 2) in the cathode ray tube display. Aircraft approaching the radar installation cause video pulses to coincide with the positive portions of the early gates 2091, charging condenser C11, causing the speed voltage at the cathode of tube V8 to rise, and the range voltage from V9 to fall. Decreasing range voltage decreases the gate width of the output of multivibrator V2 and causes the index marks 2022 (Figure 2) to move along the display toward the point 2018A of indicated touchdown. The manner in which such index marks 2022 bracketing the aircraft image 2015A, are produced from the early and late gates 2091, 2092 is now described.

For purposes of developing the index marks 2022, voltages representative of the early and late gates and appearing on the cathode of tube V3B are applied to the control grids of tubes V6A, V6B. The grid of tube V6A is coupled through condenser 2104 to an adjustable tap on the symmetry adjusting resistance 2105, such resistance 2105 being connected between ground and the cathode of tube V3B. The cathode of tube V3B is connected through a two-microsecond delay line 2106 and condenser 2107 to the control grid of tube V6B. The cathodes of tubes V6A and V6B are returned to ground through a common potentiometer resistance 2107 so that these two tubes operate essentially as a cathode follower with the adjustable tap on resistance 2107 being connected to lead 2108 (Figures 4 and 1) to which is connected an intensity control electrode of the cathode ray tube 2020. It is to be noted that the control grid of the tube V6A is connected to a −150 volt source through resistances 2111 and 2112; similarly control grid of tube V6A is connected to the same −150 volt source through resistances 2111 and 2113. Condenser 2115 has its ungrounded terminal connected to the junction point of resistances 2112, 2113. Also connected between such junction point and ground are the serially connected resistances 2117 and on-off switch 2118 for purposes of removing the index marks from the cathode ray tube display. With the switch 2118 open the condenser 2115 charges to a high negative value thereby cutting off the current flow through tube V6A and V6B and thus removing the index marks from the display. With the switch 2118 closed, the condenser 2115 is charged only to a relatively small value permitting normal operation of the tubes V6A and V6B as cathode followers. The to 52 volts depending upon the particular orientated position of the radiated antenna beam. The coupling unit 2024 is coupled to a scanning element of the antenna 2010 by means of a mechanical connection indicated by the dotted line 2026.

The antenna 2010 is supplied with pulsed energy timed in accordance with synchronizing pulses developed in the synchro-unit 2027 and applied to the transmitter 2028. The synchronizing pulses are developed at, for example, a rate of 2,000 pulses per second and are likewise applied to the cathode ray sweep generator 2029 for supplying sweep currents to two quadraturely acting deflection coils 2030 and 2031 in timed relationship with the synchronizing pulses. The sweep currents applied to one of the deflection coils 2030, 2031 is modulated by the above mentioned slower varying beam angle voltage applied to the sweep generator through lead 2025. The rate of variation of the beam angle voltage is such that it varies cyclically, for example, from 2 volts to 52 volts and then 52 volts back to 2 volts, all in one second.

The radar echo signals resulting from the reflections from the aircraft 2015, 2016 are transferred through the transmit-receive switch 2032 to the input terminal of the radar receiver 2033. The radar receiver 2033 may have so-called conventional sensitivity time control circuit 2034 coupled thereto, such circuit being supplied with synchronizing pulses from the synchronizer 2027. The output of the radar receiver 2033 in the form of video is applied to the video standardizer unit 2035 and the output of such video standardizer 2035 is transferred on the one hand to an intensity control electrode of the cathode ray tube 2020 and on the other hand to each of the tracking channels 2037 and 2038 which are designated respectively "tracking channel" No. 1 and "tracking channel" No. 2.

Each of these tracking channels 2037, 2038, as described in detail hereinafter, serves to develop pairs of voltages which are applied as index mark voltages to an intensity control electrode of the cathode ray tube 2020 for producing the corresponding index marks 2022, 2023, as represented in Figure 2. Tracking unit 2037 while tracking aircraft 2015 produces the index marks 2022 while the tracking unit 2038 in tracking the aircraft 2016 produces the index marks 2023.

The range and speed of aircraft 2015 are indicated respectively on the range meter 2040 and speed meter 2041; simultaneously, the range and speed of aircraft 2016 is indicated on range meter 2042 and speed meter 2043.

A rejection bus 2044 extends between the units 2037, 2038, or more specifically, the subunits 2051 and 2051A, for transferring certain control signals therebetween so as to prevent the possibility of both units 2037 and 2038 tracking the same aircraft.

The tracking units 2037 and 2038 have associated therewith, respectively, the so-called "no take-off" units 2045, 2046, for producing both visual and aural warnings of the fact that an incoming aircraft is within, for example, four miles of its touchdown point 2018 (Figure 1). Such warnings or indications are produced on the appropriately designated indicators 2047, 2048 on the one hand and 2049 and 2050 on the other hand. Each of the tracking units 2037, 2038 is coupled to a so-called "overtake warning" unit 2051, 2052, which functions to produce aural and visual warnings or indications on the indicators 2052A and 2053A, respectively, should the distance between the two aircraft 2015, 2016 be less than a predetermined distance. Also each one of the tracking units 2037, 2038 has associated therewith so-called "no video" units 2060, 2061, respectively, for producing both aural and visual indications on corresponding indicators 2062, 2063, and 2064, 2065 respectively should there be a loss of video signal from the tracked aircraft for a period exceeding, for example, five seconds.

The tracking unit 2037 is identical in all respects to the tracking unit 2038 shown in Figures 3 and 4 and utilizes a servo loop to which the system trigger is applied on lead 2083 and to which video is applied from lead 2084.

In general, the servo loop includes the multivibrator stage V2, the blocking oscillator stage V3, the early and late gate detector V4, V5, the differential integrator stage V7, the cathode follower stage V8, the range integrator stage V9, cathode follower stage V1B, and the lead 2082 extending from the stage V1B to the multivibrator stage V2 completes the loop. The voltage on such lead 2082 is termed "the range voltage" and is a measure of the range of the tracked aircraft, either when such aircraft is being tracked manually or automatically.

The volt meter 2040 connected to the lead 2082 through the adjustable resistance 2085 serves to indicate the range of the tracked aircraft. In order to obtain an indication of the speed of the tracked aircraft on the speed volt meter 2041, such volt meter 2041 is coupled to the lead 2082 through a differentiating network and D.-C. amplifier which includes the tube V11. By differentiating the range voltage with respect to time, a speed voltage is developed on meter 2041 and indicated thereby.

The above mentioned servo loop includes two integrator circuits which include, respectively, the condenser C11 and condenser C13, condenser C13 being associated with the range integrator stage V9. The voltage developed on condenser C11 is a measure of the velocity of the tracked aircraft and voltage derived from such condenser C11 is integrated in the stage V9 and applied as aircraft range voltage to the aforementioned lead 2082.

The manner in which the so-called speed voltage appearing on condenser C11 is developed is now described in relationship to the stages V1A, V2, V3, V4, V5 and V7.

The system trigger is applied through lead 2083 to the buffer stage V1A and, after amplification therein, is applied as a negative pulse to the control grid of V2A. The tubes V2B and V2A comprise a part of the multivibrator stage V2. It is observed that the tube V2B in its quiescent state, is highly conducting since a positive voltage appears at such time on its control grid. The cathodes of tubes V2B and V2A are interconnected so that in such quiescent state the cathode of V2A is at a relatively high positive potential. The so-called range voltage appearing on lead 2082 is applied through resistance 2087 and through a voltage dividing network 2088 to the control grid of V2A. The multivibrator stage V2 serves to develop a gating voltage on the cathode of tube V2A, the duration of which varies in accordance with the magnitude of the voltage on lead 2082. Such gating voltage is started upon appearance of the system trigger, in inverted form, to the control grid of tube V2B. The multivibrator stage V2 is thus termed a timing modulator since it serves to develop a negative-going gating voltage on the cathode of tube V2B, having a duration representative of the magnitude of the voltage appearing on lead 2082.

Such negative-going gating voltage is differentiated by the differentiating network comprising capacitor C4 and resistance R13, which are in the grid circuit of the blocking oscillator stage V3. A positive pulse corresponding to the trailing edge of the negative-going gating voltage is thus applied to the control grid of the blocking oscillator stage V3. Such positive pulse is of course delayed with respect to the system trigger in an amount corresponding to the duration of the negative-going gating voltage developed in stage V2. It is noted that the potentiometer resistance R12 is adjusted so that with zero voltage applied to lead 2082, a delay is interposed corresponding to the aircraft touchdown position while resistance R10, R11A and R11B allow adjustment of the scale of the delay with respect to range voltage.

The blocking oscillator stage V3 has two separate output circuits, one of which includes the winding 2090 for developing a so-called early gate. A late gate is developed on the anode of tube V3B. The first or "early" gate consists of a positive-going wave form 2091 followed by a intensity of the index marks may be adjusted by adjusting the position of the tap on resistance 2107.

*Minimum coast speed circuitry*

In order to avoid the possibility of the tracking unit locking on ground clutter, a minimum coast speed circuit involving the tubes V10A, V10B is provided. It is noted that the control grid of tube V10A is coupled to the movable tap on the above-mentioned resistance R38, having one terminal thereof connected to the range voltage lead 2082. The voltage thus applied to the control grid of tube V10A is a measure of the range voltage. The two tubes V10A, V10B are interconnected to function as a regenerative amplifier. A voltage dividing network in the anode circuit of tube V10A comprising resistances R42, R43, and R45 is so arranged that decreasing range voltage causes the first triode section V10A to cut off and the second triode section V10B to conduct when the tracked aircraft reaches a given range from touchdown. The value of the potential applied to the control grid of the first triode section V10A and therefore the circuit controlling voltage is varied by adjustment of the tap on potentiometer R38. A minimum coast speed voltage is applied from the adjustable tap on resistance R43 to a control grid of the cathode follower tube V8. This causes an approximately equal voltage to appear at the cathodes of V8, and maintains a minimum input value to the range integrator V9. For a minimum tracking velocity corresponding to 50 knots, the cathode of tube V8 is maintained at approximately 205 volts positive with respect to ground. The above described minimum coast speed circuitry thus provides automatic minimum velocity of the index marks 2022, with a preset range, and prevents the range gate from locking onto a fixed clutter area.

It is noted that when the above mentioned tube V10B conducts the winding of relay K1 is energized to thereby open the normally closed switch 2120 so as to connect the resistance 2121 in a serial circuit with condenser C11. Thus, while prior to the institution of coasting, the condenser C11 is connected between one control grid of tube V8 and ground but during coasting condenser C11 is connected between such control grid and ground through the resistance 2121. The time constant of the circuit is thus increased and, in effect, the "memory" of the first integrator circuit, including condenser C11, is "stiffened."

*No take-off warnings*

Voltage representative of the range voltage appearing on tap R39 is applied to the control grid of tube V23A through resistance R129. Decreasing range voltage causes the tube V23A to cut off, and the second triode section V23B to conduct when the tracked aircraft reaches a predetermined range from touchdown. In conducting, the second triode V23B energizes the winding of relay K5, sounding the no take-off chime 2048 and illuminating the white no take-off channel lamp 2047. The voltage applied to the grid of tube V23A, corresponding to the range from touchdown to which the above mentioned no take-off warnings are actuated is adjusted by adjusting the tap on resistance R39. Thus, both visual and aural indications are automatically produced when an approaching aircraft is within a given range from touchdown.

*No video alarm*

Video, coinciding with either early or late gates 2091, 2092, and developed across the center winding of transformer 2094, is applied to the control grid of the buffer amplifier tube V20. The amplified video is applied from the anode of tube V20 to the blocking oscillator stage V15. The output of stage V15, in the form of sharp pulses, is rectified by rectifier tube V16A to charge a capacitor C31 to a negative potential. The negative potential of capacitor C31 biases tube V22 to cut off. The bias thus developed is allowed to decay through the condenser discharge path which includes the serially connected resistances R93 and R88. When this bias actually decays, as a result of loss of video signals, tube V22 is allowed to conduct to thereby energize the winding of relay K6 and to in turn cause illumination of the red "no video" panel lamp 2063 and to sound the no video alarm bell 2062. It is noted that the tube V22 is a gas tube and has its cathode grounded. The anode of tube V22 is connected through the winding of relay K206, resistances R99 and switch 2150 to the positive terminal of voltage source 2151. The screen grid of tube V22 is connected through resistance R98 and switch 2150 to the same positive terminal of source 2151.

Due to circuit constants the potential on condenser C31, in the absence of video, discharges through the resistor R93 in five seconds. The absence of video signals for a two second period causes actuation of the no video warnings. It is noted that this time period of two seconds is adjustable by adjusting the position of the tap on resistance R88.

Operation of the no video alarm thus depends on firing of thyratron V22. The grid of this thyratron is normally held at a value well below cutoff by rectified range-gated video. If the target is acquired by slewing (i. e. manual tracking in the manner described later) rapidly to the proper range and immediately operating the tracking switch 2150 it is possible that gated video is available for an insufficient time before tracking begins and thus an immediate false alarm may be rendered. For this reason the shield grid of the thyratron V22 is held at a negative potential by the voltage source 2180 when the unit is slewing. When the unit is switched to the tracking function a positive potential is applied through resistor R98 to the shield grid. The shield grid potential is raised slowly by the charging of condenser C32, thus allowing sufficient time for the control grid of the thyratron to become biased to cutoff by video before the thyratron is permitted to fire. The diode, V16A connected in shunt with condenser C32, prevents the shield grid potential from rising above zero volts.

*Overtake warning in apparatus shown in Figures 1 and 4*

The late gate or so-called range gate which is designated as such in Figure 3 pulse from the two microsecond delay line 2106 is amplified by buffer tube V17A. The signal appearing on the anode of tube V17A is applied to the multivibrator stage V17B, V18A which serves to generate a negative-going gate which starts at the end of the late gate and endures for a time which is equivalent to the desired minimum separation of aircraft on the glide path approach. The width of the gate generated by multivibrators V17B, V18A, is controlled by adjustment of the tap on potentiometer resistance R105, such resistance serving to interpose a delay and determining the so-called overtake range. The gate thus generated by the multivibrator stage V17B and V18A, is mixed with corresponding gates from other tracking units applied to the anode of tube V18B over the protection bus 2044. In other words, the anode of tube V18B is connected directly to anodes of like tubes V18B in the other tracking units by means of the protection bus 2044 which extends between such tracking units. The protection bus 2044 therefore carries positive-going gates representing the safety zones behind all aircraft being tracked. A pulse corresponding to the early gate is compared with all the protection gates by mixer tube V19, which is so biased that it will conduct only when the range pulse, i. e., early gate, coincides with any portion of any protection gate existing on the protection bus. Such condition occurs only in the unit tracking the overtaking aircraft. It cannot occur within a single unit, since a two-micro-second delay provided by delay line 2106 occurs between the range pulse and the initiation of the gate. When this coincident condition occurs, conduction by tube V19 causes ionization of the gas tube V21 to thereby energize the winding of relay K7, to in turn actuate the overtake warning buzzer 2052 and illuminate the amber overtake warning panel lamp 2053.

Alarm circuits in any units which are automatically tracking are prevented from being actuated by units which are being slewed, i. e., in manually tracking condition, since the position of the resulting index marks in slewing does not necessarily correspond to that of an aircraft and no alarm is warranted. For this purpose, the anode supply for cathode follower tube V18B is interrupted by means of switch 2150 when the unit is performing the slewing, i. e., manual tracking function, thereby greatly attenuating the protection gate delivered to the protection bus 2044 by that channel. When automatic tracking begins switch 2150 is closed and the protection gate again appears at normal amplitude.

After the overtake buzzer 2052 is energized, the warning signal may be removed by pressing the "buzzer off" switch 2200 to thereby energize the winding of relay K8. Relay K8 has associated therewith switch 2180 which is connected in parallel with the buzzer off switch and thus serves as a sealing switch. Also associated with relay K8 is the switch 2181 which is normally closed and which is serially connected with the overtake buzzer 2052. Thus relay K8, because of closing of switch 2180, remains energized until the range unit is returned from the automatic tracking function to the manual tracking function, removing supply voltage to the winding of relay K8. Thus the aural warning may be actuated only once in a given channel during a channel tracking signal.

*Manual tracking, i. e., slewing*

For purposes of acquiring a target, i. e., aircraft, for subsequent automatic range tracking, a manual control is provided which includes the ganged control knob of potentiometer resistor R64 and the mechanically related switches 2155, 2150. This resistor switch combination R64, 2150, 2155 may be of conventional construction as found in the prior art wherein angular rotation of a manual control shaft serves to adjust the position of the tap on resistance R64 and axial movement of such control shaft serves to cause actuation of switches 2150, 2155 simultaneously.

As shown in Figure 4 the apparatus is conditioned for manual tracking or slewing. In such case the switches 2155, 2150 are open. It is noted that the switch 2155 has one of its terminals grounded and its movable terminal serially connected with the winding of relay K3, resistance R54, winding of relay K2 and the voltage source 2161. In the de-energized condition of relay K3, as shown, the associated switch 2162 is opened to thereby interrupt the connection to the speed meter 2041 so as to prevent its damage in the event that resistance R64 is varied too fast, in which case the artificially created speed voltage is too high and may cause damage to the motor 2041.

The other single pull double throw switch 2163 of relay K203, serves to energize the manual tracking or slew lamp 2165 through a circuit which includes the voltage source 2165, switch 2166, switch 2163 and the lamp 2165. The other relay K2 has associated therewith the two single pull double throw switches 2170, and 2097, 2099. As shown, switch 2170 serves to transfer to the control grid of tube V1B either the voltage appearing on the tap of resistance R64 or the voltage appearing on the anode of tube V9. The switch 2099 serves to ground the control grid of tube V9 through switch 2098, the switch 2098 being associated with the no video relay K6 and is normally closed. In the automatic tracking position the switch 2170 serves to interconnect the anode of tube V9 to the control grid of tube V1B; and the switch 2097 serves to transfer the voltage existing on the cathode of tube V3 to the control grid of tube V9.

Thus with the switches shown in their position in Figure 4 manual variation of the tap on resistance R64 serves to control the D.-C. voltage applied to the control grid of tube V1B and thus the potential on the range voltage lead 2082. This tap may be moved continuously to in turn produce a continuous variation on the lead 2082 and a resulting continuous movement of the index marks (which are visible on the face of the cathode ray tube). When such index marks bracket the image of an aircraft on the cathode ray tube the operator causes the switches 2150, 2155 to close so as to condition the unit for automatic range tracking. It is observed that actuation of switch 2155 to its automatic range tracking position results in energization of the windings of relay K3 and K2 to effect the afore-mentioned connections and to disconnect the slew indicating lamp 2165 and to energize the automatic tracking indicating lamp 2175.

It is noted that in the absence of video, i. e. upon actuation of the no video relay K6 described above in connection with no video circuitry, neither lamp 2165 nor lamp 2175 is energized inasmuch as the switch 2166 supplying current to either lamp 2165 or 2175, as the case may be, is interrupted; in such case only the "no video" lamp 2063 and associated bell 2062 is energized. Further, it is noted that in manual tracking, the "no video" circuitry is prevented from being operated inasmuch as the switch 2150 serving to supply current to the tube V22 is opened. Similarly, the overtake warning circuit of thyratron tube V21 is rendered inoperative during manual tracking inasmuch as it is likewise supplied with current through the switch 2150 which at this time is open.

Summarizing briefly the operation of the system, the operator first acquires a target, i. e., aircraft, with the switches 2154, 2155 in their open position shown in Figure 4 and by adjusting the tap on the potentiometer resistance R64 until the index marks observable on the face of the cathode ray tube bracket the image of the aircraft on such tube. When this condition is achieved the operator closes the switches 2154, 2155 and in such case the circuitry automaitcally tracks the movement of the aircraft in range.

It is noted that in slewing, i. e., manual tracking, the condenser C13 acquires a voltage which is representative of the range to which the index marks are displayed visually and that the condenser C13, being a storage device, remembers that range during the transition period from manual to automatic tracking. In other words, the value of voltage acquired by the condenser C13 is that value which the condenser assumes at the start of automatic tracking so that the loop as a whole, in the transition, is devoid of large transitory voltages and in fact a smooth transition is made from manual to automatic tracking.

*Calculation of integrator rate*

The range integrator consists basically of a D. C. amplifier stage V9 having degenerative derivative feed back provided by resistors 2190, 2191, and condenser C13. Regenerative feed back is provided to increase the gain, the regenerative feed back path including the resistances R37 and R36. If desired, the gain may be linearized by inserting a thyrite resistance in series with such resistors R36 and R37.

It is observed that in a perfect integrator the time constant is infinite since the slope is constant and independent of time. However, the rate of integration depends directly on the resistance and capacity components in the feed back circuit. Assuming infinite gain due to regenerative feed back across resistance R36, the grid of tube V9 may be assumed to be a virtual ground, i. e. it will remain at zero volts for all values of output and input within the limits of the circuit design. With a two microfarad capacitor as C13 and a 5.5 megohm resistor, i. e. resistance 2193 is 3.3 megohms and resistance 2191 is 2.2 megohms, comprising in combination a 11-second product and a one volt signal applied, the output changes at a rate such that the derivative developed across resistances 2190 and 2191 exactly oppose the one volt input and maintain the grid at zero voltage as expressed in Figure 6. This rate is therefore $$\frac{-1}{11}$$

volts per second. Thus the integration rate in volts per second per volt is $$\frac{1}{RC}$$

and thus establishes the integration rate.

It is observed further that the range integrator including the tube V9 supplies a range voltage to the time modulator V2 over lead 2082, which is adjusted by means of the expansion adjustments to maintain a range scale of 5 volts per mile or 50 volts for the entire 10-mile range.

The time constant of the integrator is such as to require a speed voltage input from the first integrator stage including tubes V7A and V7B, which for normal approach speeds provides ample margin for acceleration of the tracking loop to take care of initial errors existing at the time of target acquisition. Since the limits of the first integrator are approximately +45 volts and −30 volts, an arbitrary choice of 3 volts per 100 miles is made. At 100 knots, the range voltage changes:

$$\frac{\text{V.P.M.} \times \text{M.P.H.}}{3600} = \frac{5 \times 100}{3600} = .139 \text{ v./sec.}$$

The RC product of the second integrator, for the speed scale chosen, is:

$$T = \frac{e}{dE/dt} = \frac{3}{.139} = 21.5 \text{ sec.}$$

However, a voltage divider of 2:1 ratio is used, since resistance 2193 and resistance R231 are each 100,000 ohms so that a 10.8-sec. product gives the desired result. The product actually used is (2.2M+3.3M)×2u=11 sec.

The actual speed scale, including the gain of the cathode follower, is:

$$e = \frac{RC \frac{dE}{dt}}{A_{cf}} \times \text{divider ratio} = \frac{11 \times .139}{.97} \times 2$$

$$= 3.15 \text{v.}/100 \text{ M.P.H}$$

The maximum tracking speed is $$\frac{45 \times 100}{3.15} = 1400 \text{ M.P.H.}$$

In the absence of gated video information, the speed voltage output of the first integrator is remembered. Over long periods of time, however, this voltage may drift to extreme values which would handicap the lock-on process by driving the gates off the target before the video information could properly revise the speed voltage. Therefore the "slew-track" switch 2150, 2155 is connected to ground the first integrator capacitor during slewing, so that the output of the first integrator has an initial small nominal value which the loop can readily correct.

It is observed further that the condenser C12, connected in shunt with the resistances 2190 and 2193 serves to stabilize the overall loop, i. e. serves to impart a certain phase to the overall loop in relationship to the frequency of various feed back voltages so that "shunting" or oscillations in the overall loop is prevented while yet allowing the loop to respond quickly to speed voltages existing across capacitor C11. The condenser C12 serves an important function at the time of change over from manual tracking or slewing to automatic tracking, particularly when large corrections are required to make the voltage appearing across condenser C11 conform with the actual speed of the aircraft being tracked. In such case the voltage difference in the form of transient is readily passed by the condenser C12 to the control grid of the second integrator stage V9. The stage V9 thus responds quickly and provides a necessary correction voltage in a relatively short period of time.

Figure 6 serves to illustrate the operating conditions of the second integrator or range integrator shown in Figure 4. As illustrated, because of regenerative feed back between stages V9 and V1B the overall amplification may be considered to be infinite as indicated in Figure 6. In view of such high overall gain a virtual ground exists at the control grid of tube V9. Expressed mathematically, the input voltage $$E_i + K\frac{dE_0}{dt} = 0$$

K is the integration rate and is equal to 5.5×2 or 11. Since there is an expression of $$\frac{dE_0}{dt}$$

i. e., a differentiation with respect to time, the equivalent circuit shown in Figure 7 may be realized and the differentiating network therein includes the condenser C13 and resistance 2205.

Figure 5 serves to illustrate the action of the overall range tracking loop when, as assumed, the flight of the aircraft created artificially is abruptly changed from a magnitude corresponding to 100 miles per hour to a magnitude corresponding to 150 miles per hour. In such case the voltage actually appearing across the condenser C11 varies as indicated by the curve 2210 which is devoid of any oscillatory condition but has some overshoot, i. e., approximately 20% overshoot.

*Overtake warning and wave-off means illustrated in connection with Figures 8, 9 and 10*

In general, the apparatus described under this heading develops so-called "safety gates" from range gates, which are considered to be developed in the apparatus illustrated in Figures 1–4, each of such range gates being derived from the so-called late gate 2092 in Figure 4. Thus, in Figure 1 the late or range gate is developed in the gate generator V3 and applied to multivibrator V17B, V18B. Likewise, in Figures 8, 9 and 10 such late or range gate is applied to the multivibrator 1805. A comparable late or range gate developed in channel 2 is applied to the multivibrator 1806 following each tracked aircraft. These safety or guardian gates are applied to a common bus which is constantly monitored by a coincidence detector. Partial coincidence or overlapping of the safety gate of one tracked aircraft with that of another, is measured by a sawtooth generator circuit.

The degree of "overtake" expressed as an output voltage for each channel, is measured by two relay control circuits. The existence of an "overtake" condition results in the closing of the "overtake" relay which provides suitable warnings from a common bus. Greater degrees of "overtake" actuate the "wave-off" relay sending a "wave-off" signal via a ground aircraft radio link, to the tracked aircraft, releasing such aircraft from ground control.

In the AGCA system warnings of "overtake" conditions are automatically transmitted to aircraft under AGCA control. As indicated previously overtake warning is accomplished by the generation of a so-called "guardian gate" behind the range gate for each AGCA controlled aircraft, and by the continuous automatic monitoring of this moving gated region. The extent of entrance of a second aircraft into the gated area following a controlled aircraft is measured, and threshold controls provide actuation of suitable circuitry for the transmission of "warning" and "wave-off" signals to the overtaking aircraft.

Referring to the circuitry illustrated in Figures 8 and 9, this circuitry may conveniently be divided into three distinct groups, namely:

1. The channel 1 guardian gate generator and the channel 1 interference trigger measurement circuitry.
2. The channel 2 guardian gate generator and the channel 2 interference trigger measurement circuitry.
3. The intereference trigger generator circuitry, which is common to both channels 1 and 2.

The circuitry involving groups 1 and 2 above, is identical, and for that reason a description of the circuitry and operation of that for channel 1 suffices as a description for that of channel 2.

The range gates developed in channels No. 1 and 2 are applied respectively to the terminals 1801 and 1802, such terminals being connected through coupling condensers 1803 and 1804 respectively, to trigger tubes of corresponding delay multivibrator stages 1805 and 1806.

The multivibrator stage 1805 generates a gate, which is delayed with reference to the system trigger in an amount controlled by the range gate applied to terminal 1801. The width of this gate is controlled by adjustment of the tap on potentiometer resistance 1808 which establishes the channel 1 guardian range to afford an adjustment of the dimension of the safety area behind the aircraft controlled by channel No. 1.

The guardian gates developed by delay multivibrators 1805 and 1806 are represented by the gates 1809 and 1810 (Figure 10), which are shown as overlapping to develop what is termed as interference. In other words, the guardian gate 1810 falls within the guardian gate 1809 for purposes of indicating an unsafe condition. The duration of these guardian gates may be, for example, 20 microseconds in duration, but may be controlled in width by adjustment of corresponding potentiometer resistances 1808 and 1812.

The output of the delay multivibrator stage 1805 in the form of a gating voltage, is applied to two circuits, i. e., the guardian gate is applied through condenser 1815 to the control grid of the sawtooth generator stage 1816, and is applied through coupling condenser 1817 to the control grid of the mixer amplifier tube 1818.

It is observed that likewise, the guardian gate developed in the channel No. 2 delay multivibrator 1806 is applied through the same condenser 1817 to the control grid of the same mixer tube 1818, so that a stepped waveform of the character illustrated at 1819 in Figure 10 appears on the control grid of tube 1818 which is normally biased in a cut-off condition with the conducting threshold indicated in dotted lines in Figure 10.

Thus, as indicated in Figure 10, when there is interference between the guardian gates 1809 and 1810, tube 1818 is rendered conducting for purposes of triggering the blocking oscillator which includes the trigger tube 1820 and blocking oscillator tube 1826. Thus, the input at the control grid of tube 1818 consists of the mixed guardian gates from the outputs of delay multivibrators 1805 and 1806.

The adjustment of the tap on potentiometer resistance 1822 determines a threshold value, i. e., determines the position of the dotted line 1824 in Figure 10, to which the input must rise for a pulse to be passed by the tube 1818. This threshold level is therefore set at such a value so as to exclude the normal channel guardian gate, but to pass the combined pulses afforded by the mixing of the two generator guardian gates, when interference exists.

The trailing edge of the pulse 1828 thus passed by tube 1818 fires, or initiates, operation of the blocking oscillator and the output of such blocking oscillator stage appears at the cathode of the tube 1826.

It is noted that the interference gate developed on the anode of tube 1818 is of the form illustrated at 1828 in Figure 10. The voltage pulse developed on the cathode of tube 1826 is applied through a one microsecond delay line 1830 to the ungrounded terminal of the potentiometer resistance 1831 which establishes the channel No. 1 interference trigger amplitude. The adjustable tap on resistance 1831 is connected through coupling condenser 1832 to the control grid of tube 1834. The voltage wave thus applied to the control grid of tube 1834 is represented at 1836 in Figure 10, it being noted that the voltage wave 1836 is delayed one microsecond with respect to the wave 1827 for a purpose which is more evident from the following description, namely, to displace the positive pulse of wave 1836 outside of the sawtooth wave 1840 developed by the sawtooth voltage generator stage 1843.

In other words, the delay line 1830 serves to delay the waveform 1836 for a period of one microsecond moving the waveform 1836 outside of the original interference area. This is for the purpose of precluding the possibility of the interference pulse firing or initiating operation of the improper sawtooth measuring circuitry, since the interference trigger for a given overtake condition appears only within the duration of the sawtooth for the overtaking aircraft.

As mentioned previously, the output of the delay multivibrator stage 1805 is supplied through coupling condenser 1815 to the sawtooth circuitry 1816 and specifically to the control grid of tube 1843. The voltage developed on the anode of tube 1843 is a sawtooth wave of the form illustrated at 1840 in Figure 10, such sawtooth wave 1840 occurring at a delay with relationship to the system trigger in an amount controlled by the range gate of the aircraft being tracked or controlled.

The sawtooth wave 1840 is applied to the grid circuitry of tube 1834, which is so biased that it passes current only at the coincidence of the interference trigger and the sawtooth wave shape. For this purpose, the control grid of tube 1834 is connected through resistance 1845 and 1846 to the adjustable tap on resistance 1847, which has one of its terminals grounded and the other one of its terminals connected to a minus 150 volt source 1850.

As a result of this coincidence of the channel sawtooth and interference trigger pulses, a voltage is developed at the cathode of tube 1834, such voltage having an amplitude determined by the degree of entry of the interference trigger under the sawtooth wave shape as indicated at 1852 in Figure 10. Thus, the interference trigger may be thought of as riding up on the sawtooth slope and protruding into the region of grid voltage of tube 1834 corresponding to plate current flow, by an amount depending upon the degree of overtake. This coincident condition is illustrated generally at 1855. The voltage thus developed on the cathode of tube 1834 is applied to the pulse transformer 1856 for subsequent rectification by the conventional voltage doubling circuitry including tubes 1857 and 1858. The rectifier input pulse appears as indicated at 1860 in Figure 10.

The rectified voltage developed on the cathode of tube 1857 is applied to the control grid of the relay control tube 1861. The bias supplied to the control grid of tube 1861 is determined by the position of the tap on the potentiometer resistance 1862 which essentially determines the level to which the rectifier tube must rise before tube 1861 conducts sufficient current to close relay 1865. As such, potentiometer resistance 1862 affords a vernier adjustment useful in executing an alignment procedure for the equipment.

Assuming the aforementioned conditions, tube 1861A conducts, and the current passed by such tube flows through two parallel circuits, including on the one hand the relay winding 1864A and on the other hand, the relay winding 1865A. Relay winding 1864 constitutes an element of the channel No. 2 wave-off relay 1866A; while relay winding 1865A constitutes an element of the channel No. 2 warning relay 1867A. As the degree of "overtake" increases, the degree of interference between the interference trigger and the sawtooth increases, raising the control voltage supplied to tube 1861A and causing a larger flow of current into the cathode circuit of that tube.

Resistance 1870A serially connected with coil 1864A provides an adjustment as to the amount of current drawn through the relay coil 1864A and determines the degree of "overtake" condition which will cause actuation of the switches of the channel No. 2 wave-off relay 1866A.

Smaller degrees of "overtake" result in a smaller flow of cathode current in tube 1861A, actuating the switches of relay 1867A to thereby apply a plus 28 volt signal on the "overtake" warning channel No. 2" line 128. Larger degrees of "overtake" result in the additional closing of relay 1866A, opening the "wave-off" ground circuit and applying a positive potential out to the system on the "alarm bus."

Figure 10 illustrates typical operation of the circuitry illustrated in Figures 8 and 9 and illustrates a condition of "overtake" occurring with the aircraft controlled by channel No. 2 overtaking the aircraft controlled by No. 1 channel.

The output of the delay multivibrator 1805 (channel No. 1) is shown at 1809, and the output of delay multivibrator 1806 (channel No. 2) is shown at 1810. Mixing of the two multivibrator outputs on the guardian gate bus is shown at 1819, with a larger pulse occurring at the coincidence of the two gates.

As illustrated in 1828 threshold control has removed the lower part of the waveform and only the area of interference is shown. The differentiated waveform at 1827 and the blocking oscillator delayed waveform at 1836 illustrate the waveform before and after the blocking oscillator and one microsecond delay imposed by the delay line 1830, placing the positive-going pulse outside of the original interference area.

The output of the channel No. 2 sawtooth generator is illustrated at 1875 and such sawtooth is modulated by the delayed blocking oscillator pulse as illustrated at 1855. It is readily seen, as indicated at 1852, that as the degree of interference increases, the interference trigger moves further up on the sawtooth, increasing the amplitude of the rectifier input pulse illustrated at 1860. Threshold settings for "warning" and "wave-off" conditions are illustrated at 1877.

*Modified arrangement shown in Figure 11 for detecting not only following aircraft but also preceding aircraft*

In Figures 9 and 11 similar elements have identical reference numerals, it being noted that Figure 11 duplicates some of the apparatus illustrated in Figure 9, but Figure 11 in addition discloses circuitry including the delay lines, 1830A, 1830B, special saw-tooth generators 1843E, 1843F, 1843G in channels 1, 2 and 3 respectively, as well as related voltage doubling and peak rectifying circuits 1857C, 1857D and 1857E.

Figure 12 illustrates the type of saw-tooth wave form developed in stages 1843E, 1843F and 1843G, for obtaining information with respect to the preceding aircraft, it being noted, that such saw-tooth wave form is a reversed saw-tooth wave in that the saw-tooth wave decreases from an initial maximum value to a minimum value and thus differs from the saw-tooth waves illustrated as 1840 and 1875 in Figure 10.

The undelayed interference gate 1828, after differentiation by the condenser 1828A and resistor 1828B combination, is applied to each of such stages 1843E, 1843F and 1843G.

The guardian gate developed respectively by the channels No. 1, 2 and 3 in multivibrator stages 1805, 1806 and 1806A, is applied through corresponding delay lines 1830A, 1830B and 1830C, to the saw-tooth generator stages 1843E, 1843F, and 1843G.

The stages 1843E, 1843F, and 1843G, serve to measure the degree to which the leading negative going pip of the differentiated interference gate 1827 encroaches within the saw-tooth waves of the character illustrated at 1843-L in Figure 12, the greater the encroachment, the greater is the control voltage developed in the voltage doubling peak rectifying stages 1857C, 1857D and 1857E, as the case may be. The delay lines 1830A, 1830B, 1830C may be one microsecond delay lines to assure non-spurious operation as a result of the accompanying positive going pip of the differentiated interference gate 1827.

Thus, recapitulating, that portion of the arrangement shown in Figure 11 identical with the corresponding portion of Figure 9, serves to delay the differentiated interference gate with respect to a saw-tooth wave developed substantially contemporaneously with guardian gates for purposes of obtaining information with respect to a second aircraft approaching the first aircraft; while also, Figure 11 illustrates means whereby the differentiated interference gate is not delayed but is compared with said saw-tooth wave delayed with respect to the corresponding guardian gate so as to develop similar information with respect to a preceding aircraft.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described: means for producing and scanning an antenna beam through space and developing a plurality of video echo signals, one from each of a corresponding plurality of objects in said space, means sensitive to said video signals for developing a plurality of voltages each representative of the range of the corresponding objects, means for comparing said voltages, to develop a third voltage which is representative of the difference in range of said objects, and control means operated by said third voltage only when said third voltage exceeds a predetermined limit.

2. In a system of the character described: means producing a plurality of time-spaced pulses, one of said pulses being an early pulse and the other pulse being a late pulse, saw-tooth generating means operated by said late pulse, a control voltage developed in accordance with said early pulse, means for comparing the instantaneous amplitude of the saw-tooth wave generated by said saw-tooth generating means with said control voltage to develop a control voltage, and means operated by said control voltage and producing different control effects depending upon the relative magnitudes of said control voltage and saw-tooth wave at any particular instant.

3. In a system of the character described: means for producing a pair of time-spaced pulses, one of said pulses being an early pulse and the other pulse being a late pulse, saw-tooth generating means initiated by said early pulse for developing a saw-tooth wave, means initiated by said late pulse for developing a control voltage, and means for comparing said control voltage with said saw-tooth wave to develop a second control voltage, and means operated by said control voltage and producing a plurality of different control effects depending upon the instantaneous value of said saw-tooth wave upon occurrence of said first mentioned control voltage.

4. In a system of the character described: means for producing and scanning an antenna beam through space to develop resulting echo video signals from objects in said space, a plurality of range tracking means each sensitive to a corresponding one of said video signals for developing a corresponding voltage representative of the range of the object being tracked, means for comparing that voltage corresponding to one object with that voltage corresponding to the other object, said comparing means comprising saw-tooth generating means initiated by said voltage corresponding to said one object, and means for deriving a control voltage in accordance with that voltage corresponding to the other object, and means for comparing the instantaneous magnitude of said saw-tooth wave generated by said saw-tooth generating means at the occurrence of said control voltage.

5. In a system of the character described: means for producing and scanning an electromagnetic beam through space and developing a plurality of video echo signals, one from each of a corresponding plurality of randomly disposed objects in said space, means for developing a range gate from a corresponding video signal, each of said range gates being each delayed in time an amount representative of the range of the corresponding object, a plurality of multivibrator stages each sensitive to different range gates for developing guardian gates, saw-tooth generator stages coupled to each of said multivibrator stages for developing saw-tooth waves each having a time duration commensurate with the duration of corresponding guardian gates, a blocking oscillator stage coupled to each of said multivibrator stages, said blocking oscillator stage being normally inoperative but being rendered operative upon overlapping in time of the guardian gates developed in said multivibrator stage, and means comparing the time-spacing of the pulse developed in said blocking oscillator with the amplitude of the saw-tooth wave generated in one of said saw-tooth generators and functioning to produce different control effects depending upon the instantaneous amplitude of the saw-tooth wave when said pulse occurs.

6. In a system of the character described: means for producing and scanning an electromagnetic beam through space and developing a plurality of video echo signals, one from each of a corresponding plurality of randomly disposed objects in said space, means for developing a range gate from a corresponding video signal, each range gate being delayed an amount representative of the range of a corresponding object, a multivibrator stage sensitive to each of said range gates for developing guardian gates, and means for comparing said guardian gates and functioning to produce a control effect upon overlapping in time of said guardian gates.

7. In a system of the character described: means for producing and scanning an electromagnetic beam through space and developing a plurality of video echo signals, one from each of a corresponding plurality of randomly disposed objects in said space, means for developing a range gate from a corresponding video signal, each of said range gates being delayed in time an amount representative of the range of a corresponding object, guardian gate generating means sensitive to said range gates for developing guardian gates, and means for comparing said guardian gates and functioning to develop a control effect when said guardian gates overlap in time.

8. The arrangement set forth in claim 7 in which means are provided for adjusting the time duration of said guardian gates.

9. In a system of the character described: means for producing and scanning an electromagnetic beam through space and developing a plurality of video echo signals, one from each of a corresponding plurality of randomly disposed objects in said space, means for developing a range gate from a corresponding video signal, each of said range gates being delayed in time an amount representative of the range of a corresponding object, guardian gate generating means sensitive to said range gates for developing corresponding guardian gates, saw-tooth generating means sensitive to said guardian gates for developing saw-tooth waves each having a duration commensurate with the duration of corresponding guardian gates, means for comparing said guardian gates and for developing an interference gate upon overlap in time of said guardian gates, and means sensitive to said interference gate for producing a control voltage for comparison with instantaneous magnitudes of said saw-tooth waves to produce different control effects.

10. In a system of the character described: means for producing and scanning an antenna beam through space and deriving resulting echo video signals, one from each of a corresponding plurality of objects in said space, range tracking means sensitive to said video signals for developing a plurality of voltages each representative of the range of corresponding ones of said objects, and means for comparing a first voltage due to one of said objects with a second voltage due to another one of said objects, means acting by virtue of the comparison of said first and second voltages for producing a control voltage which has a characteristic representative of the spacing between said one object and said other object.

11. In a system of the character described: means for producing and scanning an antenna beam through space and deriving resulting echo video signals, one from each of a corresponding plurality of objects in said space, range tracking means sensitive to said video signals for developing a plurality of voltages each representative of the range of corresponding ones of said objects, and means for comparing a first voltage due to one of said objects with a second voltage due to another one of said objects, means acting by virtue of the comparison of said first and second voltages for producing a control voltage which has a characteristic representative of the spacing between said one object and said other object, and means controlled by said control voltage in accordance with said characteristic.

12. In a system of the character described: means for producing and scanning an antenna beam through space and deriving resulting echo video signals, one for each of a corresponding plurality of randomly disposed objects in said space, and means for comparing the time-spacing of a first video signal derived from one object with the time spacing of a second video signal derived from another object, means acting by virtue of the comparison of said one video signal with said other video signal for producing a control voltage which has an amplitude representative of the spacing between said one object and said other object, and means controlled by said control voltage in accordance with the amplitude of said control voltage.

13. In a system of the character described: means for producing and scanning an antenna beam through space to develop echo video signals from objects in said space, said means including a source of triggering pulses, a plurality of range tracking means each sensitive to said video signals for developing corresponding range gates each delayed with respect to the same triggering pulse in an amount representative of the range of a tracked object, and means comparing the time-spacing of a first range gate of one of said objects with a second range gate of another one of said objects, and means acting by virtue of the comparison of said first range gate with said second range gate for producing a control voltage which has an amplitude representative of the difference in range between said one object and said other object, and means controlled by said control voltage in accordance with its amplitude.

References Cited in the file of this patent

UNITED STATES PATENTS

| | | |
|---|---|---|
| 2,421,018 | De Rosa | May 27, 1947 |
| 2,568,265 | Alvarez | Sept. 18, 1951 |
| 2,577,536 | MacNichol | Dec. 4, 1951 |
| 2,703,399 | Williams et al. | Mar. 1, 1955 |

OTHER REFERENCES

"Electronic Time Measurements," B. Chance et al., M. I. T. Rad. Series, vol. 20, 1949, page 379.